Aug. 23, 1938.  R. ERBAN  2,127,588
GEAR
Filed July 11, 1933  4 Sheets-Sheet 1
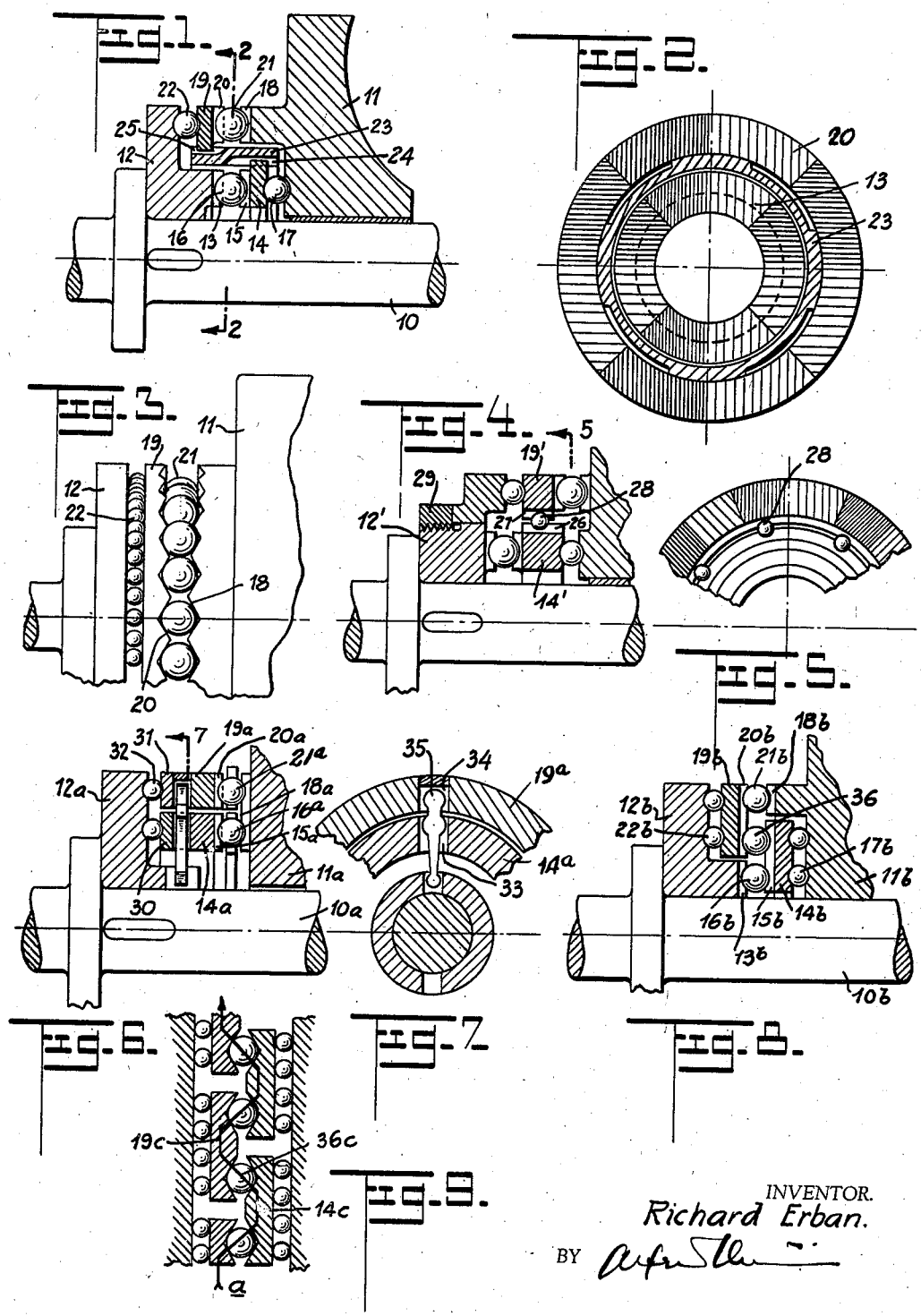
INVENTOR.
Richard Erban.
BY
ATTORNEY.

Aug. 23, 1938.   R. ERBAN   2,127,588
GEAR
Filed July 11, 1933   4 Sheets-Sheet 2
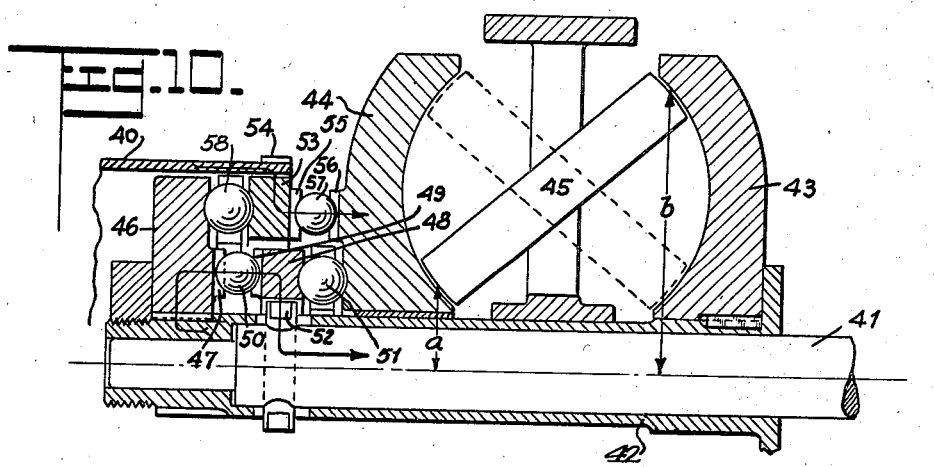
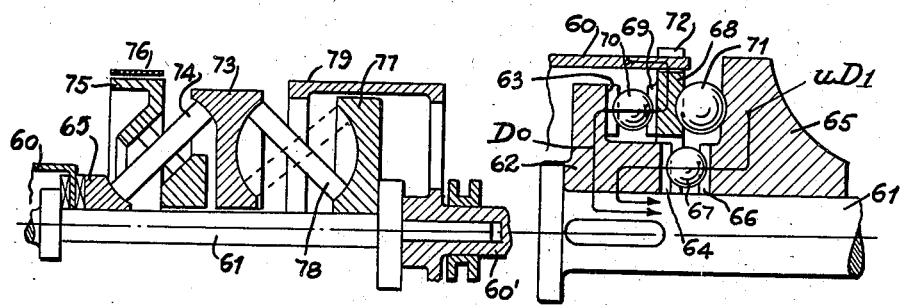
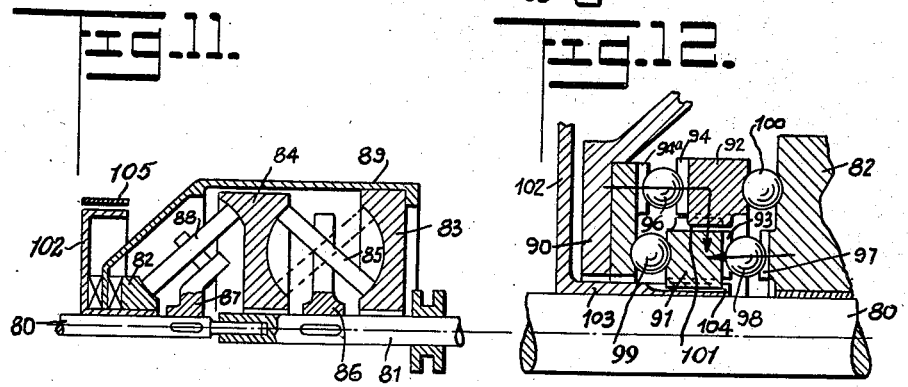
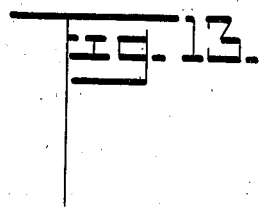
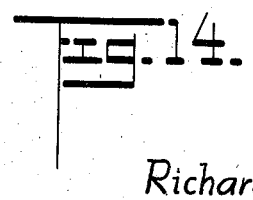
INVENTOR.
Richard Erban.
BY
ATTORNEY.

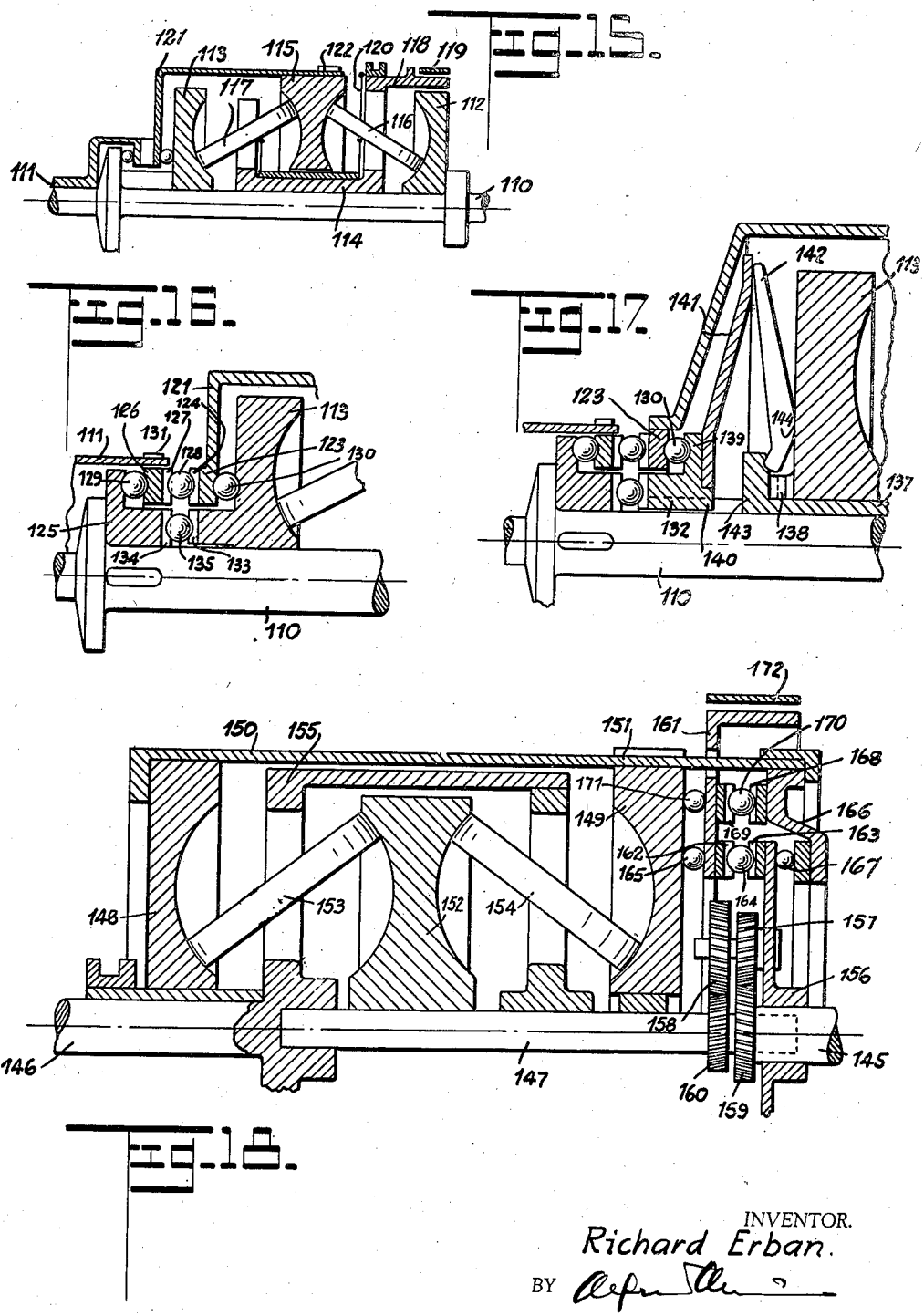

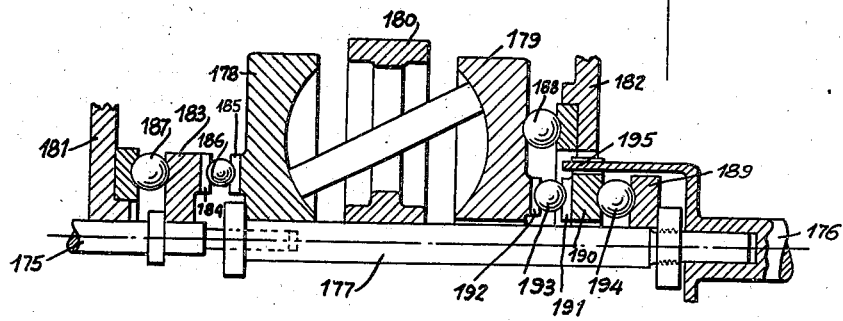
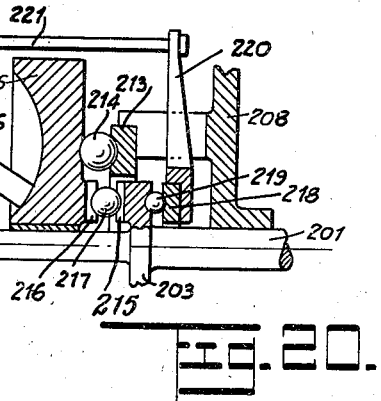

Patented Aug. 23, 1938

2,127,588

UNITED STATES PATENT OFFICE 2,127,588

GEAR

Richard Erban, Vienna, Austria, assignor to Erban Patents Corporation, a corporation of New York Application July 11, 1933, Serial No. 679,843
In Austria March 1, 1933

22 Claims. (Cl. 74—208)

This invention relates to improvements in means for utilizing the torques of rotating bodies to produce forces parallel to the axis of rotation of the bodies, and is particularly intended for use with friction gears to produce thrusts in an axial direction to effect required tractive pressures between frictionally engaged gear elements to enable the gear to transmit desired torques.

In particular it relates to the application to a friction gear of the axial thrusts of a plurality of devices generating such thrusts in response to torques passing therethrough, each of said devices being so associated with the system that the thrust thereof is applied to the system along a path not including any of the other devices, in other words the thrusts of the various devices are applied in a parallel relation, as opposed to a serial relation in which the thrusts of the devices furnish a reaction for each other.

Devices for utilizing the torques of rotating bodies to produce axial thrusts thereof are known and usually comprise a pair of relatively rotatable parts having cooperating inclined or helical surfaces which, by virtue of their wedging action in response to relative rotation of the parts caused by the transmission of torques therethrough, produce axial displacement of the parts which is utilized to effect required tractive pressures between th elements of a gear. However, the production of high pressures by means of such thrust devices heretofore has been attended by many difficulties, to a considerable extent ascribable to the necessarily limited angles which may be given the inclined or helical surfaces and to the relatively small areas upon which the axial forces may be exerted. Hence, because of the necessarily limited dimensions of such thrust devices, it is difficult to perform therewith large amounts of work without causing the devices to fail.

Accordingly, one important object of the invention is to provide a novel combination of a plurality of torque transmitting, thrust producing devices whereby desired high working pressures may safely be attained.

Further difficulties arise in friction gears having a variable ratio of transmission. In gears of this kind the required tractive pressure between the gear elements to enable the gear to transmit desired torques varies with and is dependent upon the gear ratio. On the other hand, in thrust devices, as mentioned, the axial thrust produced varies almost in direct proportion to the torque transmitted. Moreover, while the torques of the driving and the driven elements of a gear are relatively different for different gear ratios, variations in either of said torques considered alone differ materially from the variations in required tractive pressure between the gear elements. Consequently, since heretofore only one of said torques has been utilized to actuate a thrust device to produce tractive pressure between the elements of a gear, the pressure produced has not properly been varied with variations in the gear ratio, but at times has materially exceeded, and at other times has been less than that required to furnish the desired traction. The result has been excessive wear on the gears and the thrust producing devices with failure of the latter due to high pressures at certain times, and slippage of the gears with attendant excessive wear thereon and early deterioration at other times.

Accordingly, another important object of the present invention is to provide a novel combination of a plurality of torque transmitting, thrust producing devices with each other and with the driving and the driven elements of a variable ratio friction gear, whereby, regardless of variations in the gear ratio, a non-excessive and at the same time ample tractive pressure between the gear elements is produced at all times.

In accordance with the invention the foregoing purpose may be accomplished by the utilization of two or more thrust devices each producing axial forces which are independent of one another and which combinedly effect a resultant force which represents the axial thrust brought to bear upon the gear or parts to be subjected to thrusts, or provision may be made to have one or more of the component thrusts oppose other component thrusts so that the resultant and effective thrust may be the difference between the component thrusts. The thrust devices may be arranged consecutively to transmit a single torque, in which case a considerable resultant thrust can be produced according to the number of thrust devices used, or the torques of different gear parts may be utilized to drive the different thrust devices, and if these different gear parts transmit different torques the resultant thrust will bear a definite relationship to the different torques utilized. Thus, if the torques utilized are derived from gear parts whose torques are varied in accordance with variations in the gear ratio, the resultant thrust will likewise bear a definite relationship to the gear ratio at any given instant. Furthermore, various combinations of thrust devices actuated by different torques existing in a system of friction gearing may be utilized so that resultant thrusts varying in different proportions to the required tractive pressure may be produced.

Different practical embodiments of the invention are illustrated in the accompanying drawings, wherein:

Figure 1 is a fragmentary longitudinal section through a friction gear illustrating one form of torque transmitting thrust producing means in accordance with the invention.

Figure 2 is a transverse section on the line 2—2 of Figure 1, the balls being omitted.

Figure 3 is a fragmentary plan view of a construction similar to that illustrated in Figure 1.

Figure 4 is a view similar to Figure 1 illustrating another form of the invention.

Figure 5 is a section on the line 5—5 of Figure 4.

Figure 6 is another view similar to Figure 1 illustrating another form of the invention.

Figure 7 is a section on the line 7—7 of Figure 6.

Figure 8 is another view similar to Figure 1 illustrating another form of the invention.

Figure 9 is a sectional view illustrating another form of the invention.

Figure 10 is a view similar to Figure 1 illustrating the combination of torque transmitting, thrust devices substantially as shown in Figure 1 with the driving and the driven elements of a friction gear having a variable ratio of transmission and in which the driving and the driven elements rotate in opposite directions.

Figure 11 is a longitudinal section through a friction gear in which the driving and the driven elements thereof rotate in the same direction, and showing the combination therewith of torque transmitting, thrust producing means in accordance with the invention.

Figure 12 is an enlarged view of the torque transmitting thrust producing means illustrated in Figure 11.

Figure 13 is a view similar to Figure 11 illustrating another form of the invention in which the driving and the driven elements of the gear rotate in the same same direction.

Figure 14 is an enlarged view of the torque transmitting thrust producing means illustrated in Figure 13.

Figure 15 is another view similar to Figure 11 illustrating another form of the invention.

Figure 16 is an enlarged view of the torque transmitting, thrust producing means illustrated in Figure 15; and Figures 17, 18, 19 and 20 are longitudinal sectional views illustrating other forms of the invention.

Before entering into a detailed description of the various forms of my invention, I will premise that a characteristic of all of them is the use of a plurality of independently acting thrust devices to impart their thrusts to the race and roller system in a parallel relation. The reaction for the thrust of each of said devices is furnished by a pair of relatively fixed opposed abutments. Each thrust device is positioned intermediate a pair of such abutments and the race and roller system so that as it expands the adhesive driving contact of the race and rollers will be maintained. Each thrust device may have its own special abutments or the same abutments may serve in common for a plurality of thrust devices.

Such a system is radically different from a system in which a plurality of thrust devices are used in a serial relation. For example one form of a serial system might comprise a pair of opposed relatively fixed abutments and between them would be positioned the race and roller system while intermediate the race and roller system and each abutment would be positioned a thrust device. The thrust generated by either thrust device would therefore be applied first to the race and roller system, and then to the other thrust device. The pressure on the race and roller system would be equal to the thrust generated in one of the thrust devices, namely of that thrust device which gives the greater thrust. On the other hand the thrust on the race and roller system in a transmission according to my invention in which the thrust devices are in parallel will be the sum of the thrusts of the various devices.

In the systems of Figures 1, 4, 8 and 9 all of the thrust devices are positioned intermediate one of the abutments and one of the races and a single torque passes in serial relation through all of the thrust devices. Each thrust device however generates and delivers its thrust to the race independently of the other thrust devices, and the total thrust on the race is the sum of the thrusts of the two thrust devices, and not as in a series relation of thrust devices, equal to the greater of the thrusts.

In the systems of Figures 10 to 18 inclusive while the thrusts of the devices are still in parallel, the thrust devices are not subjected to the same torque, so that the series torque relation mentioned in the preceding paragraphs does not exist.

In the systems of Figures 19 and 20 the thrust devices are positioned at opposite ends of the system and are actuated by different torques. Although superficially these systems resemble systems in which two thrust devices are used in series such is not the case, as will appear hereinafter when these systems are discussed in detail.

Referring to the drawings in detail, first with particular reference to the embodiment of the invention illustrated in Figures 1 to 3, 10 designates a driving element, in this instance, a rotatable shaft, and 11 designates an element to be driven, in this instance a race member of a friction gear. The element 11 is mounted on the shaft 10 for both rotation and longitudinal movement relative thereto, while affixed to the shaft 10 at the outer side of the element 11 is a thrust collar 12. Between the collar 12 and the element 11 is interposed the means for transmitting torque from the shaft 10 to said element 11 and for producing axial thrust upon said element to effect tractive pressure between the gear parts (not shown).

The torque transmitting, thrust producing means illustrated in Figures 1 to 3 comprises what may be regarded as two separate devices operable one through the other to transmit the torque and independently operable to produce thrust, so that the effecive thrust is the sum of the thrusts of the two individual devices. On the inner face of the thrust collar 12 is formed an annular series of inclined surfaces 13 adjacent pairs of which are inclined in opposite directions and form V-shaped depressions, while formed on the outer face of a ring 14, which is interposed between the element 11 and the thrust collar 12, is an annular series of inclined surfaces 15 adjacent pairs of which are inclined in opposite directions and also form V-shaped depressions. The V-shaped depressions of the collar and the ring are disposed oppositely and cooperate to form an annular series of pockets, and in each pocket is disposed a ball 16, while preferably but not necessarily anti-friction balls 17 are interposed between the ring and the element 11. This constitutes one of the devices.

On the outer face of the element 11 outwardly of the first described device is formed an annular series of inclined surfaces 18, adjacent pairs of which are inclined in opposite directions and form V-shaped depressions, while formed on the inner face of a ring 19 which is interposed between the element 11 and the thrust collar 12 is an annular series of inclined surfaces 20 adjacent pairs of which are inclined in opposite directions and form V-shaped depressions. As in the case of the device first described the V-shaped depressions of the element 11 and the ring 19 are disposed oppositely and cooperate to form an annular series of pockets in each of which is disposed a ball 21, while preferably but not necessarily anti-friction balls 22 are interposed between the ring 19 and the thrust collar 12. This constitutes the other device which, considered as an entirety, is disposed outwardly of the first device.

At 23 is designated a cylindrical member which is interposed between the rings 14 and 19 and which has splined connections with said rings as indicated at 24 and 25, respectively. Said rings thus are connected together for unitary rotation but are free to move longitudinally relative to each other.

Assuming rotation of the shaft 10 and resistance to rotation of the element 11, it is apparent that torque will be transmitted from the shaft to said element through oppositely inclined surfaces of the collar 12 and the ring 14 and the interposed balls 13, through the cylindrical member 23 and through oppositely inclined surfaces of the ring 19 and the element 11 and the interposed balls 21, while through each device will be exerted an axial thrust on the element 11 due to the wedging action of the balls 13 and 21 against the oppositely inclined surfaces 13, 15 and 18, 20, respectively, the total thrust exerted being the sum of the thrusts of the two separate devices. Further, it is apparent that the two thrusts are exerted at different distances from the axis of the element 11, so that they are distributed over a considerable area. Consequently, high working pressures may safely be produced. Moreover, it is manifest that instead of employing only two devices as described, three, four or more devices serially arranged may be employed to produce still higher working pressures. Furthermore, it is apparent that by employing a plurality of thrust devices cooperating serially to transmit the torque, the wedge angles of the inclined surfaces may be made higher than heretofore to permit the use of more pairs of said surfaces and more balls to carry the thrust, and the balls may be smaller than heretofore.

In Figure 3 I have shown a construction that differs from that of Figure 2 in that a greater number of surfaces 18, 20 and balls 21 are used.

In the operation of the forms of the invention illustrated in Figures 1 to 3, the rings 14 and 19 move to a slight extent axially relative to the cylindrical member 23, with the result that thrust diminishing frictional forces are set up in the splined connections 24 and 25 between said rings and said member. Figures 4 and 5 illustrate that these frictional forces may be considerably diminished and that the thrust may be correspondingly increased by arranging the ring 14' within the ring 19'; by providing the outer and the inner faces of the respective rings with grooves 26 and 27, and by disposing balls 28 in said grooves to spline the rings together. Thus torque will be transmitted between the rings without appreciable friction losses due to relative axial movements of the rings. Figure 4 also illustrates that the outer portion of the thrust collar 12' may be formed separately from the inner portion thereof and may be mounted on the inner portion for axial adjustment relative thereto by a nut 29 threaded on the inner portion, thus to regulate the outer thrust device independently of the inner thrust device. In other respects the construction illustrated in Figures 4 and 5 is practically the same as the construction illustrated in Figures 1 to 3.

Referring to the embodiment of the invention illustrated in Figures 6 and 7 of the drawings, 10a designates a drive shaft and 11a designates an element to be driven, which element is both rotatable and axially movable relative to the drive shaft. At 14a and 19a are designated two rings interposed between the element 11a and a thrust collar 12a fixed on the shaft 10a and the former of which is disposed within the latter. Against the outer faces of said rings 14a, 19a are disposed rings 30, 31, respectively, and between these rings and the collar 12a are interposed anti-friction balls 32, while on the inner faces of said rings 14a, 19a are formed inclined surfaces 15a, 20a, respectively, similar to the inclined surfaces on the rings 14 and 19 heretofore described. On the outer face of the element 11a are formed cooperating inclined surfaces 18a, and between said surfaces 15a, 18a and 20a, 18a are interposed balls 16a, 21a, respectively. The rings 14a, 19a are provided with radial slots 33 and 34, respectively, and within said slots is disposed the outer end portion of a lever 35 the inner end of which is disposed in a slot in the collar 12a. Rotation of the shaft 10a effects rocking of the lever 35 with consequent relative rotation of the rings 14a, 19a in opposite directions, and thus, while rotation of the shaft 10a is imparted through said rings and the balls 16a, 21a and the inclined surfaces with which said balls cooperate to the element 11a, the torque of shaft 10a constitutes the difference of the constituent torques of the respective devices upon the element 11a. By suitable choice of leverage the component torques may be chosen at will. Moreover, this construction permits the wedge angles to be considerably varied.

Figure 8 illustrates what may be considered as a development of the embodiment of the invention illustrated in Figures 4 and 5 and wherein three thrust devices are operated by a single torque. A driving shaft is designated as 10b and an element 11b to be driven is rotatable and axially movable relative to said shaft. On the shaft 10b is affixed a thrust collar 12b the inner portion of the inner face of which is provided with inclined surfaces 13b. Outwardly of the inclined surfaces 13b are other inclined surfaces 18b formed on the outer face of the element 11b. Rings 14b, 19b are interposed between the collar 12b and the element 11b and have their outer and inner portions, respectively, disposed in overlapping relationship. These rings are of widths to extend inwardly and outwardly, respectively, in overlapping relationship to the inclined surfaces 13b, 18b, respectively, and said rings on their adjacent faces are provided with inclined surfaces 15b, 20b, respectively. Between the inclined surfaces 13b of the collar 12b and the inner portions of the inclined surfaces 15b of the ring 14b are interposed balls 16b; between the inclined surfaces 18b of the element 11b and the outer portions of the inclined surfaces 20b of the ring 19b are interposed balls 21b, and between the outer and the inner portions, respectively, of the inclined surfaces of the rings 14b, 19b are interposed balls 36. Anti-friction balls 17b are interposed between the ring 14b and the element 11b and other anti-friction balls 22b are interposed between the ring 19b and the collar 12b. Thus, manifestly, three thrust devices operable by a single torque are provided, since the balls 16b, 36 and 21b in cooperation with their related inclined surfaces serve to transmit rotation of the shaft 10b to the element 11b, while thrust is exerted successively through the balls 16b, 36 and 21b and their cooperating inclined surfaces and the effective thrust is the sum of the three individual thrusts.

Figure 9 illustrates that the principle of seriation of torque and paralleling of axial thrusts may be realized in such a way that instead of employing continuous rings as in Figure 8, sectors or segments which are mobile in relation to each other may be employed. Figure 9 may be presumed to illustrate a construction which is the same as the construction illustrated in Figure 8 with the exception that the rings 14b, 19b are composed of separate segments or thrust plates 14c, 19c. Thus it is apparent that a plurality of balls 36c arranged in a single circle may be disposed in series as regards transmission of torque and in parallel in regard to the axial thrust generated by them, for if a torque acts on one segment or thrust plate it will be consecutively transmitted through all of the plates and balls as indicated by the line a, while the inclined surfaces of the respective segments or thrust plates in coopertion with the interposed balls will set up as many thrusts as there are balls 36c.

Figure 10 illustrates what is known as a swivel roller friction gear having a variable ratio of transmission and the combination therewith of a plurality of torque transmitting, thrust producing devices which are designed to produce at all times substantially the exact axial thrust theoretically required to provide desired tractive pressure between the gear elements. A driving element in the form of a tubular shaft is designated as 40, while at 41 is designated a driven element in the form of a shaft which is coaxial with the driving shaft. Rotatable and axially slidable on the driven shaft 41 is a sleeve 42 having fixed thereon a race element 43 and also having mounted thereon for rotation and axial sliding movement relative thereto a second race element 44. The race elements 43, 44 are spaced apart and have interposed therebetween rollers 45 (one only being shown) which are shiftable between the full and dotted lines positions shown to vary the gear ratio.

Fixed on the sleeve 42 is a thrust collar 46 having on its inner face inclined surfaces 47, while interposed between said inclined surfaces 47 and the race element 44 is a ring 48 having on its outer face inclined surfaces 49. Between and cooperating with said inclined surfaces 47, 49 are balls 50, while interposed between the ring 48 and the race element 44 are anti-friction balls 51. The ring 48 has a splined connection as indicated at 52 with the shaft 41, which splined connection is effected through a suitable opening or openings in the sleeve 42 so that the latter may, as aforesaid, rotate and move axially unimpededly relative to the shaft 41. Outwardly of the ring 48 is another ring 53 with which the tubular driving shaft 40 has a splined connection as indicated at 54, while on the face of said ring 53 adjacent to the race element 44 are provided inclined faces 55. Other cooperating inclined surfaces 56 are provided on the adjacent face of the race element 44, and between said inclined surfaces 55, 56 are interposed balls 57, while between the ring 53 and the collar 46 are interposed anti-friction balls 58.

Rotation of the driving shaft 40 imparts rotation to the ring 53 and said ring operates through the inclined surfaces 55 and 56 and the interposed balls 57 to transmit torque to the race element 44 and to produce axial thrust thereof. On the other hand, rotation of the race element 43 imparts rotation to the sleeve 42 and the collar 46 and said collar operates through the inclined surfaces 47 and 49 and the interposed balls 50 to transmit torque to the ring 48 and through said ring to the shaft 41 through the splined connection 52, and at the same time to produce thrust on the race element 44.

For a brief study of the kinetic conditions for different ratios of the gear illustrated in Figure 10, symbols will be used as follows:

D—1 the torque of the driving race 44.
D—2 the torque of the driven race 43.
N—1 the speed of revolution of the driving race 44.
N—2 the speed of revolution of the driven race 43.
A—1 the thrust developed between the wedge surfaces 55 and 56.
A—2 the thrust developed between the wedge surfaces 47 and 49.
a the distance from center of shaft 41 to the point of contact between roller 45 and race 44.
b the distance from center of shaft 41 to the point of contact between roller 45 and race 43.

Then since $$\frac{N-2}{N-1}=\frac{a}{b} \text{ and } \frac{D-1}{D-2}=\frac{a}{b}$$

it follows that $$\frac{N-2}{N-1}=\frac{D-1}{D-2}=\frac{a}{b},$$

and since $$\frac{a}{b}$$

is the gear ratio it follows that the torques D—1 and D—2 vary directly as the gear ratio. Any axial force exerted on the race 44 will be transmitted through the roller 45 to the race 43. If $a=b$ then the thrust between roller 45 and the races 43 and 44 is equal to the axial thrust A—1 and A—1=A—2. Neglecting the fact that for other oblique positions of the roller 45 the component of A—1 (and likewise A—2) transmitted through the roller is greater than A—1 because of the varying angle the gear axis makes with the plane of the roller, it may be said that ideal conditions obtain when the total thrust is just sufficient to provide the necessary tractive pressure to transmit the torques or when A—1 plus A—2=K(D—1 plus D—2)=A—3 in which K is some constant and A—3 represents the thrust necessary to provide just sufficient tractive pressure to transmit the torques. Since $$\frac{D-1}{D-2}=\frac{a}{b}$$

then $$D-2=\frac{D-1 b}{a}$$

and $$A-3=K\left(D-1 \text{ plus } \frac{D-1 b}{a}\right)=\frac{KD-1 \text{ (a plus} b)}{a}=KD-1\frac{a \text{ plus } b}{a}$$

Then if only the thrust device comprising the wedge surfaces 55 and 56 and the balls 57 is used A—2 would become zero and the expression $$A-3 = KD-1\ \frac{a\ \text{plus}\ b}{a}$$

would become $$A-1 = KD-1\ \frac{a\ \text{plus}\ b}{a}$$

or $$\frac{A-1}{D-1} = K\ \frac{a\ \text{plus}\ b}{a}$$

However, this expression is for ideal conditions. Actually $$\frac{A-1}{D-1} = K$$

or ideal conditions prevail when $$\frac{a\ \text{plus}\ b}{a} = 1$$

or the more nearly the dimension $b$ becomes zero the more nearly ideal conditions prevail. For greater values of the dimension $b$ the expression $$\frac{A-1}{D-1}$$

becomes greater, which means that the gearing is being subjected to greater thrusts than are necessary.

If only the thrust device comprising the wedge surfaces 47 and 49 and the balls 50 is used A—1 would become zero and the expression
$$A-3 = K(D-1\ \text{plus}\ D-2)$$
would become $$A-2 = K\left(\frac{D-2a}{b}\ \text{plus}\ D-2\right) = KD-2\ \frac{a\ \text{plus}\ b}{b}$$

or $$\frac{A-2}{D-2} = K\ \frac{a\ \text{plus}\ b}{b}$$

However this expression is for ideal conditions. Actually $$\frac{A-2}{D-2} = K$$

or ideal conditions prevail when $$\frac{a\ \text{plus}\ b}{b} = 1$$

or when $a$ becomes zero. The greater the value of $a$ the greater is the value of the expression $$\frac{A-2}{D-2}$$

which is equivalent to saying that the gearing is being subjected to greater thrusts than are necessary.

Thus, when only A—1 was used the greater the gear ratio $$\frac{a}{b}$$

became and the more nearly the thrust produced became equal to the thrust required to provide just sufficient tractive pressures. When only A—2 was used the lesser the gear ratio $$\frac{a}{b}$$

became and the more nearly the thrust produced became equal to that required to provide just sufficient tractive pressures. By providing thrust devices in combination as in Figure 10 the total thrust is A—1 plus A—2 and a compensating effect is established and ideal conditions are approached throughout a greater range of gear ratios and much excessive overloading of the gear parts obviously may be avoided.

It having been explained in connection with Figure 10 how thrust devices associated with driving and driven elements rotating in opposite directions may be arranged in parallel regarding their axial forces, there will now be described by reference to Figures 11 to 14 arrangements where the thrusts are parallel regarding their axial forces and are generated by parts having the same direction of rotation.

Figure 11 illustrates a gear of what is known as the differential type wherein the thrust devices are shown diagrammatically, while Figure 12 is an enlarged section through the thrust devices. A driving element in the form of a hollow shaft is designated as 60, while at 60' is designated a driven shaft which is coaxial with the driving shaft and with an intermediate shaft 61. Fixed on the shaft 61 is a thrust collar 62 having outer and inner annular series of inclined surfaces 63 and 64, respectively, on its inner face, while loosely mounted on said shaft for rotation and axial movement relative thereto is a race element 65 having an annular series of inclined surfaces 66 on its outer face for cooperation with the inclined surfaces 64. Between the inclined surfaces 66, 64 are interposed balls 67. At 68 is designated a ring which is interposed between the race element 65 and the outer portion of the collar 62, and on the outer face of which is an annular series of inclined surfaces 69 for cooperation with the inclined surfaces 63. Between the inclined surfaces 63, 69 are interposed balls 70, while between the ring 68 and the race element 65 are interposed anti-friction balls 71. The shaft 60 has a splined driving connection as indicated at 72 with the ring 68.

Mounted on the shaft 61 for rotation and axial movement relative thereto is a second race element 73, and between this race element and the race element 65 are interposed rollers 74 which are carried by a cage 75. This cage, and with it the rollers 74, is freely rotatable about the shaft 61 and, as shown, the rollers 74 have fixed angles of inclination relative to the shaft 61. At 76 is designated a brake strap for cooperation with the cage 75 to hold the same against rotation.

Fixed to the shaft 61 in spaced relationship to the race element 73 is a third race element 77, and between said race elements 73, 77 are interposed rollers 78 which cooperate at their peripheries with transversely arcuate adjacent faces of said race elements. The rollers 78 are carried by a rotatable cage or support 79 which is fixed to the driven shaft 60' and said rollers are angularly adjustable in any suitable manner between the full and dotted line positions shown to vary the gear ratio.

The shaft 60 drives the ring 68 and through the inclined surfaces 69, 63 and the interposed balls 70 and the collar 62, drives the shaft 61 and at the same time sets up an axial thrust upon the race element 65 which is proportional to the torque as represented by the line $D_0$. Through the race element 77, the rollers 78, the race element 73 and the rollers 74 the race element 65 is driven, and as is manifest said race element 65 rotates in the same direction and at the same speed as the shaft 61 for any angular position of adjustment of the rollers 78.

As long as the cage or support 75 is capable of free rotation the gear idles or is disengaged, but when said cage or support is held against rotation as by means of the brake strap 76 power transmission is effected. For the production of an axial force which always answers the requirements of the gear it is necessary to add the axial thrusts corresponding to the torques of the race elements 73, 77. The race element 73 rotates oppositely to the direction of rotation of the race element 77 and its speed is different from the speed of said race element 77 in all except intermediate angular positions of adjustment of the roller 78. On the other hand, the race element 65 rotates at the same speed and in the same direction as the race element 77, and the torque transmitted from it to the shaft 61 bears a fixed relationship to the torque of the race element 73 due to the invariable gear ratio of the rollers 74. Hence, the torque of the race element 65 may be employed as the second torque.

If, in accordance with the symbols employed in explaining the action of the gear illustrated in Figure 10, the torque of the race element 73 is denoted as D—1 and the torque of the race element 77 is denoted as D—2, then the torque transmitted from the race element 65 by way of the inclined surfaces 66, 64 and the interposed balls 67 to the shaft 61 is as represented by the arrow in Figure 12 $uD-1$ wherein $u$ is employed to denote the gear ratio of the gear 65, 74, 73. On the other hand, D—2 is constituted by $D_0$ plus $uD-1$. Hence, it would appear that $uD-1$ should first pass through a thrust device and then be led together with $D_0$ by way of a second thrust device. However, as illustrated in Figure 12, $D_0$ is led through the thrust device 68, 69, 70, 63 and 62, and $uD-1$ is led through the thrust device 65, 66, 67, 64 and 62 wherein the wedge angles of the inclined surfaces 64, 66 are such as to set up an axial pressure which is twice as large as would be the case if $uD-1$ were led by way of two thrust devices. The result is that although the thrusts are generated by parts having the same direction of rotation, they are parallel and the total thrust is approximately just that required at all times to produce desired tractive pressure between the gear elements. Moreover, the arrangement illustrated provides for the use of only a single row of balls 71.

Figures 13 and 14 illustrate that in a manner similar to that shown and described in connection with Figures 11 and 12, thrust devices may be cooperatively arranged to assure desired tractive pressure between the elements of a gear wherein the driving and the driven shafts rotate in the same direction and have a speed ratio of 1:1. Neglecting frictional losses, the reaction of such a gear is zero, and if a thrust device were to be controlled by the reaction moment the axial force also would be zero and power transmission would not be possible. The driving shaft is designated as 80 and the driven shaft, coaxial therewith, is designated as 81. Loosely mounted on the shaft 80 for rotation and axial movement relative thereto is a race element 82, while loosely mounted on the shaft 81 for rotation and axial movement relative thereto are race elements 83 and 84. Between and cooperating at their peripheries with the arcuate adjacent faces of the race elements 83 and 84 are rollers 85 which are carried by a cage or support 6 which is keyed to the driven shaft 81, said rollers 85 being angularly adjustable in any suitable manner between the full and dotted line positions shown to vary the gear ratio. On the drive shaft 80 is fixed a cage or support 87, and carried by this cage or support are rollers 88 which are interposed between the race elements 82, 84 and which have fixed angles of inclination relative to the common axis of the shafts 80, 81. The race element 83 is fixed to a casing 89 which extends forwardly in enclosing relation to the race elements and which, at its forward end, is directed inwardly to provide an abutment 90. Between the abutment 90 and the race element 82 are interposed inner and outer rings 91 and 92, the former having inclined surfaces 93 on its face adjacent to the race element 82 and the latter having inclined surfaces 94 on its face adjacent to the abutment 90. On the inner face of the abutment 90, or on an element separate from but fixed to said abutment, are inclined surfaces 94a for cooperation with the inclined surfaces 94 of the ring 92 through interposed balls 96, while on the outer face of the race element 82 are inclined surfaces 97 for cooperation with the inclined surfaces 93 of the ring 91 through interposed balls 98. Between the ring 91 and the abutment 90 are anti-friction balls 99, while between the ring 92 and the race element 82 are anti-friction balls 100. The rings 91, 92 are splined together as indicated at 101. At 102 is designated a brake drum which is mounted loosely on the shaft 80 and which has a tubular part 103 extending into the ring 91 and to which said ring is splined as indicated at 104, while at 105 is designated a brake band which is operable to hold said brake drum against rotation.

As long as the brake drum 102 is permitted to rotate freely the gear idles or is disengaged, but when said brake drum is held against rotation power transmission is effected, since rotation of the shaft 80 imparts rotation to the cage 87 and through the race system of race elements and rollers to the cage or support 86 and the driven shaft 81. The connections between the race element 82 and the abutment 90 on the one hand, and between the abutment 90 and the brake drum on the other hand are effected through the described thrust devices, and when rotation of the race element 82 is arrested, as occurs when the brake is applied, the race ring 84 is rotated by the rollers 88 in the same direction but faster than the shaft 80.

When the rollers 85 are in their full line positions the shaft 81 is rotated in the same direction and at the same rate of speed as the shaft 80, but the speed of the shaft 81 drops as the rollers 85 are shifted toward their dotted line positions. The race element 84 furnishes the torque D—1 and hence the race element 82 furnishes the torque $uD-1$ as denoted by the arrow in Figure 14 wherein $u$ as in the case of Figures 11 and 12 denotes the gear ratio of 82, 88, 84. On the other hand, the torque D—2 as indicated by the arrow in Figure 14 is furnished by the race element 82. The torque $uD-1$ is transmitted from the race element 82 through the thrust device comprised by the inclined surfaces 93, 97 and the interposed balls 98 to the ring 91 and thence by way of the splined connection 104 to the brake drum 102, while the torque D—2 is transmitted from the race element 83 through the casing 89, its abutment 90, the inclined surfaces 95, 94 and the interposed balls 96 to the ring 92 and from said ring through the splined connection 101 to the ring 91 and also by way of the splined connection 104 to the brake drum, equalization of slight torsional movements of the rings 91, 92 being assured by the balls 99, 100, respectively. Thus, it again is apparent that the thrust imposed on the gear elements is at all times approximately just the amount required to afford the desired traction, and in this connection it is further apparent that while a splined connection between the rings 91, 92 has been illustrated, this is not essential and may be dispensed with, as also may one of the rows of anti-friction balls, by employing an arrangement as illustrated in Figure 12.

Friction gears of the type wherein two swivel roller sets operate in parallel as regards the torques transmitted thereby are known, and Figures 15 to 18 illustrate the application of thrust means operating in accordance with the invention to gears of this type, Figures 15, 16 and 17 illustrating a gear in which the driving and the driven shafts rotate in opposite directions, and Figure 18 illustrating a gear in which the driving and the driven shafts rotate in the same direction.

Referring to Figures 15 and 16, the driving shaft is designated at 110 and the coaxial driven shaft as 111. Fixed on the shaft 110 is a race element 112, while mounted loosely on said shaft for rotation and axial movement relative thereto is a second race element 113. Also mounted on the shaft 110 for rotation relative thereto is a roller cage or support 114 on which is mounted for free rotation and axial movement a third race element 115 which is disposed between the race elements 112, 113. The cage or support 114 carries a set of swivel rollers 116 which are interposed between the race elements 112, 115 and which cooperate at their peripheries with the arcuately curved adjacent faces of said race elements. Also carried by said support 114 is a second set of swivel rollers 117 which are interposed between and cooperate at their peripheries with arcuately curved adjacent faces of the race elements 113, 115. Rigid with the cage or support 114 is a brake drum 118, while at 119 is designated a brake band for cooperation with said drum to hold the cage or support 114 against rotation. Any suitable means as conventionally illustrated at 120 are provided for conjointly adjusting the two sets of rollers 116, 117 to vary the gear ratio.

At 121 is designated a casing which at one end has a splined connection 122 with the race element 115 and which at its other end is directed inwardly across the outer face of the race element 113 and carries a ring 123 having on its outer face inclined surfaces 124. At 125 is designated a thrust collar which is fixed to the shaft 110, while at 126 is designated a second ring having on its inner face inclined surfaces 127. Between the rings 123, 126 are interposed balls 128 for cooperation with the inclined surfaces of said rings, while between the collar 125 and the ring 126 are interposed anti-friction balls 129, and between the ring 123 and the race element are interposed anti-friction balls 130. The shaft 111 has a splined connection with the ring 126 as indicated at 131.

Inwardly of the ring 123 is another ring 132 having on its outer face inclined surfaces 133, while on the inner face of the thrust collar 125 are cooperating inclined surfaces 134, balls 135 being interposed between said collar and ring for cooperation with their inclined surfaces.

The torque D—1 is transmitted by way of the race element 113 and the inner thrust device and the torque D—2 is transmitted from the casing 121 to the driven shaft by way of the outer thrust device. Inasmuch as the shafts 110, 111 rotate in opposite directions the two thrust ball bearings 129, 130 are required, and since these bearings are required to transmit the full pressure of the thrust device considerable losses result. However, these losses may be materially diminished by increasing the wedge angles of the inclined surfaces 124, 127 and by providing for obtaining requisite thrust through the instrumentality of a lever system as illustrated in Figure 17.

According to the arrangement illustrated in Figure 17 a sleeve 137 is rotatably mounted on the shaft 110 and the race elements 112, 113 are mounted on said sleeve, the former being fixed to the sleeve and the latter being splined thereon as indicated at 138. The ring 132 is provided with a flange 139 and the balls 130 are interposed between this flange and the ring 123 instead of between the ring 123 and the race element 113 as in Figure 16. The ring 132, moreover, is splined to the sleeve 137 as at 140 and carries a disk 141, and between this disk and the race element 113 is interposed a series of levers 142 which, at their outer ends, are engaged by the disk. The sleeve 137 is provided with an annular flange 143, and the levers 142 at their inner ends are rockably seated against this flange, while intermediate their ends they are fulcrumed against the race element 113 as indicated at 144. Consequently, inward movement of the disk 141 effects rocking of the levers 142 with the result that the sleeve 137 is urged outwardly and the race element 113 is urged inwardly, thereby producing tractive pressure between the gear elements. In other respects the arrangement is, or may be, the same as illustrated in Figures 15 and 16. Shaft 110 transmits the whole torque D—1 by way of the thrust device 125, 134, 135, 133 to the ring 132, and said ring in turn transmits the torque through the splined connection 140 to the sleeve 137, whence it is transmitted to the race elements 112, 113. The torque D—2 is transmitted from the race element 115 to the driven shaft 111 through the casing 121 and the thrust device 123, 124, 128, 127, 126. The ball bearings 129, 130, respectively, transmit the axial pressure to the collar 125 and the ring 132. In other words, the two thrust devices are disposed in parallel between the collar 125 and the ring 132. The ring 132 transmits its axial force through the disk 141 to the levers 142 and said axial force thereby is amplified and imposed on the race element 113.

Referring now to the arrangement illustrated in Figure 18 wherein the driving and driven shafts rotate in the same direction, 145 designates the drive shaft, 146 the driven shaft, and 147 an intermediate shaft. On the shafts 146 and 147 are journaled race elements 148, 149, respectively, the former of which is fixed to a casing 150 and the latter of which has a splined connection with said casing as indicated at 151. Keyed to the shaft 147 is an intermediate race element 152, and between this race element and the race elements 148, 149 are interposed angularly adjustable swivel rollers 153, 154, respectively, which are carried by a common cage or support 155 rigid with the driven shaft 146.

A support 156 is journaled on the drive shaft 145 and carries a stub shaft on which are journaled relatively fixed gears 157, 158, the former and smaller of which meshes with a gear 159 fixed to the drive shaft, and the latter and larger of which meshes with a gear 160 fixed to the intermediate shaft 147. Thus, the intermediate shaft and the race element 152 fixed thereto are driven at a speed higher than that of the drive shaft.

A brake drum 161 extends inwardly into overlapping relationship to the support 156, and on said brake drum and said support are inclined surfaces 162, 163, respectively, between which are interposed balls 164, while between the brake drum and the race element 149 are interposed anti-friction balls 165. A flange structure 166 extends inwardly from the casing 150 and between this flange structure and the support 156 in alinement with the balls 164, 165 are interposed anti-friction balls 167.

Outwardly of the thrust device comprised by the inclined surfaces 162, 163 and the interposed balls 164 is another thrust device comprising inclined surfaces 168, 169 on the flange structure 166 and the brake drum 161, respectively, and interposed balls 170, anti-friction balls 171 being interposed between the brake drum and the race element 149 in alinement with said second thrust device.

A brake band 172 is provided to hold the brake drum 161 against rotation, and when said drum is so held the torque D—2 is transmitted from the drive shaft through the race elements and the interposed rollers to the casing 150, with the result that the second mentioned thrust device is actuated to produce axial thrust of the race element 149.

The torque D—1 on the other hand results from the reaction of the gear support 156 due to the tendency of said gear support to rotate counter to the drive shaft 145 and is imparted to the first mentioned thrust device with the result that the latter thrust device also is actuated to produce axial thrust on the race element 149. Thus again the total axial thrust exerted is equal to K—1 D—1 plus K—2 D—2, K—1 and K—2 representing constants as is understood.

In the embodiments of the invention heretofore described the various thrust devices are disposed in parallel not only as regards their axial forces, but also as regards their relative disposition or geometric arrangement. However, this is by no means necessary, for two or more thrust devices may be so arranged that while they appear to be in series disposition geometrically they are nevertheless in parallel so far as concerns their axial forces. Such arrangements are illustrated in Figures 19 and 20.

Referring to the arrangement illustrated in Figure 19, 175 and 176 designate coaxial driving and driven shafts, respectively, or vice-versa, and 177 designates an intermediate shaft, shaft 177 being axially movable relative to shaft 176, and shaft 175 being axially movable relative to shaft 177 as shown.

Fixed on shaft 177 is a race element 178, while loose on said shaft is a race element 179, and between these race elements are angularly adjustable or swivel rollers carried by a cage or support 180. A casing has one inwardly directed end portion 181 disposed at the outer side of the race element 178 and its other inwardly directed end portion 182 disposed at the outer side of the race element 179. Fixed on the shaft 175 is a ring 183 having on its inner face inclined surfaces 184. Companion inclined surfaces 185 are provided on the race element 178, and between said inclined surfaces are interposed balls 186, while between the ring 183 and the related end portion 181 of the casing are interposed anti-friction balls 187.

At the other end of the gear, anti-friction balls 188 are interposed between the race element 179 and the end portion 182 of the casing. This constitutes one thrust device.

On the shaft 177 is fixed a collar 189, and between this collar and the race element 179 is a ring 190 having on its inner face inclined surfaces 191. Companion inclined surfaces 192 are provided on the outer face of the race element 179, and between said inclined surfaces are interposed balls 193, other anti-friction balls 194 being interposed between the ring 190 and the collar 189. A tubular end portion of the shaft 176 has a splined connection 195 with the ring 190. This constitutes the second thrust device. Thus, while the two thrust devices are disposed at opposite ends of the gear and are substantially axially alined, they obviously are independently operable to produce thrusts on the gear and the total thrust imposed is the sum of the two thrusts.

Figure 20 illustrates an arrangement similar to that illustrated in Figure 19 wherein the axial pressure of one of the thrust devices is transmitted directly to the race elements and the interposed rollers and the axial pressure of the other thrust device is transmitted through a pressure intensifying lever system. Alined driving and driven shafts 200, 201 are provided with collars 202, 203, respectively, and have journaled thereon race elements 204, 205, respectively, between which are interposed angularly adjustable rollers 206. A casing has one inwardly directed end portion 207 disposed at the outer side of the race element 204 and its other inwardly directed end portion 208 disposed at the outer side of the race element 205. On the inner face of the collar 202 are inclined surfaces 209, while on the outer face of the race element 204 are companion inclined surfaces 210. Balls 211 are interposed between the inclined surfaces 209, 210 and anti-friction balls 212 are interposed between the collar 202 and the related end portion 207 of the casing. At the opposite end of the gear a ring 213 is supported by the other end portion of the casing and interposed between said ring and the race element 205 are anti-friction balls 214. This constitutes one of the thrust devices.

On the inner face of the collar 203 are inclined surfaces 215, while on the outer face of the race element 205 are companion inclined surfaces 216. Between said inclined surfaces 215, 216 are interposed balls 217, while between the collar 203 and a ring 218 are interposed anti-friction balls 219. The ring 218 is axially movable and has arms 220 radiating therefrom, which arms at their outer ends are connected by rods 221 with the outer ends of levers 222 at the opposite end of the gear. The levers 222 bear at their inner ends against the end portion 207 of the casing and intermediate their ends have fulcrum engagement, as indicated at 223, with a ring 224 which bears through interposed anti-friction balls 225 against the race element 204. This constitutes the other thrust device.

Obviously the thrust device first described transmits its thrust directly to the gear elements, while the thrust device last described transmits its thrust in an amplified manner through the levers 222. Thus while the respective thrust devices again are not disposed geometrically parallel but are alined, or substantially alined, and are disposed at opposite ends of the gear, their axial forces obviously are parallel so that the total axial force exerted on the gear is the sum of the forces of the two thrust devices.

From the foregoing description considered in connection with the accompanying drawings it is believed that the construction, operation and advantages of the invention will be clearly understood. It is desired to point out, however, that while certain specific structural embodiments of the invention have been illustrated and described, these are representative only of various other structures in which the features of the invention may be embodied within its spirit and scope as defined in the appended claims.

I claim:

1. In mechanism of the class described, a pair of relatively rotatable elements, a plurality of devices operatively connected to said elements to transmit torque therebetween and to impose axial pressures thereon, each device comprising a pair of relatively rotatable members having wedging means therebetween whereby in transmitting the torque they are wedged apart to impose axial thrust on the elements, the members of the respective devices being arranged serially as regards transmission of the torque with one member of each device splined to one member of another device.

2. In a device of the class described, two members each capable of driving the other, and a system for transmitting the torque from one to the other of the said members and operable to impose a plurality of axial thrusts, each independent of the others, upon the system, and each of said axial thrusts being developed by the transmitted torque.

3. In a device of the class described, two members each capable of driving the other, and a system for transmitting the torque from one to the other of the said members and operable to impose a plurality of independent thrusts at different points in the system, and each of said axial thrusts being developed by the transmitted torque.

4. In a device of the class described, two members each capable of driving the other, and a system for transmitting the torque from one to the other of the said members including means for imposing a plurality of independent axial thrusts upon the system, and each of said axial thrusts being developed by the transmitted torque.

5. In a mechanism of the class described, driving and driven elements, an abutment, a pair of thrust devices between the driven element and said abutment, each thrust device including a rotatable member having torque transmitting and thrust producing wedging cooperation with the driven element, and a torque transmitting connection between the driving element and said devices comprising a lever operatively connected to the driving element and the rotatable members of the respective devices so that rotation of the driving element tends to rotate the members of the respective devices in opposite directions.

6. In a transmission mechanism of the class described, a plurality of relatively rotatable transmission elements including races and rollers in frictional driving contact with each other, a plurality of torque loading devices operatively connected in parallel to said transmission elements to impose contact pressure upon the driving contact between the said races and rollers, each torque loading device comprising cam faced wedging means which adds to the contact pressure caused between said races and said rollers by all the other devices, at least one of said torque loading devices having a member sustaining full stress from the wedging means of its related device only and being rotatable relatively to each of said plurality of elements to render effective its related wedging means.

7. In a transmission mechanism of the class described, a pair of relatively rotatable transmission elements, rolling means for transmitting torque between said transmission elements, a plurality of supplementary torque loading devices operatively connected in parallel to said transmission elements to impose additive axial stresses upon said transmission elements, each torque loading device comprising pairs of opposing parts at least one of which has thereon cam faced wedging means which produces the stress between said transmission elements dependent upon the torque transmitted by the respective torque loading device, at least one of said torque loading devices having a member sustaining stress from the wedging means of its related device only, said member being movable relatively to each of said plurality of elements to render effective the wedging means controlled by said member.

8. In a mechanism of the class described, comprising at least two supplementary torque-loaders, means for transmitting the torque from one of said torque-loaders to the other, and means whereby the sum of the axial forces sustained by said mechanism is equal to the sum of the pressures developed by the torque-loaders.

9. In a mechanism of the class described, comprising at least two supplementary torque-loaders, means for transmitting torque to each of said torque-loaders individually to render each individually effective, and means whereby the contact pressure sustained by the frictional driving contact of the said mechanism varies in proportion to and is caused by the sum of the pressures developed by the said torque loaders.

10. In a mechanism of the classs described, comprising at least two supplementary torque-loaders, means for transmitting torques to and between said torque-loaders, said means including a leverage system for changing the torques so transmitted, and means whereby the sum of the axial forces sustained by said mechanism is equal to the sum of the pressures developed by the torque-loaders.

11. In a mechanism of the class described, comprising at least two supplementary torque-loaders, means for transmitting torques to and betweeen said torque-loaders, said means including a leverage system for changing the magnitude of the torques so transmitted and for reversing the direction of the torque transmitted to one of said torque-loaders, and means whereby the sum of the axial forces sustained by said mechanism is equal to the sum of the pressures developed by the torque-loaders.

12. In a mechanism of the class described, comprising two separate supplementary torque-loaders arranged coaxially one surrounding the other, a leverage system movably interconnecting said torque-loaders for transmitting torques between them and means whereby the sum of the axial forces sustained by said mechanism is equal to the sum of the pressures developed by the torque-loaders.

13. In a mechanism of the class described, comprising a plurality of concentrically arranged supplementary torque-loaders, at least one thrust bearing positioned adjacent to one of the torque-loaders and arranged to sustain the axial pressure of said one torque-loader only, means for transmitting to each of the torque-loaders individually the torque which is required to render it effective, and means whereby the sum of the axial forces sustained by said mechanism is equal to the sum of the pressures developed by the torque-loaders.

14. In a mechanism of the class described, comprising two coaxially arranged supplementary torque-loaders, at least one thrust bearing positioned adjacent to one of the torque-loaders and arranged to sustain the pressure of one torque-loader only, means for transmitting to each of the torque-loaders individually the torque which is required to render it effective and means whereby the total axial force sustained by said mechanism is equal to the sum of the pressures developed by the torque-loaders.

15. A friction transmission, comprising races and rollers contacting therewith, a first torque-loader for developing a contact pressure between said races and rollers, a second torque-loader, separate from the first and supplementary thereto, for developing another axial pressure independent of the first, means to transmit said supplementary pressure to said races in addition to the pressure developed by said first torque loader for increasing the contact pressure between said races and rollers over that developed by the first said loader, and means for transmitting torques to each of the torque-loaders individually to render them effective.

16. A variable speed friction transmission comprising toric races and tiltable rollers therebetween, two supplementary torque-loaders arranged coaxially with said races, means for transmitting to each of said torque-loaders individually that torque which is required to render it individually effective, and means whereby the sum of the axial forces sustained by the races and rollers is equal to the sum of the pressures developed by the torque-loaders.

17. In a mechanism of the class described, a driving element and a driven element coaxial therewith, an abutment opposite said driven elements, two supplementary torque-loaders interposed between said abutment and said driven element, means for transmitting torques from said driving element to said torque-loaders, said means comprising a leverage system tending to move the two torque-loaders in opposite direction relative to each other, and means whereby the total axial force acting upon the driven element is equal to the sum of the pressures developed by the two torque loaders.

18. In a mechanism of the class described for transmitting torque, a driving element, a driven element, at least two supplemental torque-loaders, abutment means cooperating with each of said torque-loaders, means to transmit to each of said torque loaders individually the torque which is required to render each of the said loaders individually effective, and means to transmit the individual pressures from said torque-loaders to said elements whereby the sum of the axial forces sustained by said elements is equal to the sum of the individual pressures developed by said torque-loaders.

19. In a mechanism of the class described for transmitting torque, a driving element, a driven element, an abutment adjacent to one of said elements, at least two supplementary torque-loaders between said abument and said adjacent element, said torque loaders being movable relatively to each other and operable independently of each other, and means to transmit torque to each of said torque-loaders individually whereby the axial force sustained by said elements is equal to the sum of the pressures developed by said torque-loaders.

20. A friction transmission having a pair of toric races and tiltable rollers therebetween, a shaft and a sleeve surrounding said shaft, a first torque-loader positioned laterally to one of the races and a thrust bearing interposed between said torque-loader and said race, means for transmittitng torque between said sleeve and one side of said torque-loader and means for transmittting torque between said shaft and the other side of said torque-loader, a second torque-loader connected directly to said race, means for transmitting torque to said second torque-loader to render it effective, and means whereby the axial force sustained by said races and rollers is equal to the sum of the pressures developed by said torque-loaders.

21. A friction transmission having toric races and rollers, a driving shaft and a driven shaft, a first torque-loader operatively connected to said driving shaft and one of said races, so as to transmit the driving torque from said shaft to said race, means for imposing the pressure developed by said first torque-loader upon said races and rollers, a second torque-loader separate and independent from the first and operatively connected to the other race and to said driven shaft, so as to transmit torque from the driven race to the driven shaft, and means to impose upon said races and rollers the pressure developed by said second torque-loader as a supplemental pressure in addition to the pressure developed by the said first torque-loader.

22. In a mechanism of the class described for transmitting torque, a system comprising a pair of toric races and power transmitting rollers between said races; at least two concentric members rotatable relatively to each other and all of said members passing through one of said races which rotates around said members; torque loading means comprising an abutment and a relatively movable pressure producing member; said abutment being connected to one of said concentric members and said pressure producing member being connected to the other of said concentric members; means connecting said system to one of said concentric members to apply torque thereto, and a thrust bearing between said pressure producing member and the race which is rotatable around said concentric members.

RICHARD ERBAN.